United States Patent [19]

Jenny et al.

[11] Patent Number: 4,513,571
[45] Date of Patent: Apr. 30, 1985

[54] METHOD OF SUPERCHARGING INTERNAL COMBUSTION ENGINES USING EXHAUST TURBOCHARGERS WITH VARIABLE EXHAUST GAS SWALLOWING CAPACITY

[75] Inventors: Ernst Jenny, Baden; Andreas Mayer, Niederrohrdorf; Peter Moser, Boppelsen, all of Switzerland

[73] Assignee: BBC Brown, Boveri & Company, Limited, Baden, Switzerland

[21] Appl. No.: 418,601

[22] Filed: Sep. 16, 1982

[30] Foreign Application Priority Data

Sep. 22, 1981 [CH] Switzerland ............... 6093/81

[51] Int. Cl.³ .................................. F02B 37/12
[52] U.S. Cl. .............................. 60/603; 60/605
[58] Field of Search ............... 60/600, 601, 602, 603, 60/605

[56] References Cited

U.S. PATENT DOCUMENTS 3,257,796 6/1966 Updike .................... 60/602
4,248,047 2/1981 Sumi ....................... 60/602
4,355,503 10/1982 Grohn ................... 60/605 X
4,373,335 2/1983 Kuribayashi .............. 60/602
4,391,184 7/1983 Yamane et al. ............ 60/602

Primary Examiner—Michael Koczo
Attorney, Agent, or Firm—Oblon, Fisher, Spivak, McClelland & Maier

[57] ABSTRACT

A method for supercharging internal combustion engines with turbochargers wherein the engine is operated in the lowest load region as a naturally aspirated engine, and the waste gate, the inlet section of the turbine and all other exhaust gas ducts present are fully open. When this load range is exceeded, the flow area of the turbine inlet is reduced to its minimum operational value and subsequently, with a further increase in load, is increased again to its maximum value at full load. The engine operated according to this method has a varioturbocharger whose turbine inlet flow area is controlled by a throttle slide as a function of the fuel injection quantity and the boost pressure by means of an adjustment device and a control pressure modulator.

7 Claims, 11 Drawing Figures

METHOD OF SUPERCHARGING INTERNAL COMBUSTION ENGINES USING EXHAUST TURBOCHARGERS WITH VARIABLE EXHAUST GAS SWALLOWING CAPACITY

BACKGROUND OF THE INVENTION

1. Field of the Invention

The present invention concerns a method for supercharging internal combustion engines and an internal combustion engine operating by this method.

2. Description of the Prior Art

The engines of passenger cars are operated on the average with samll mean effective pressure $p_{me}$ and low average speeds $n_m$ compared with the corresponding values at the nominal power. Typical figures for a diesel engine, for example, are mean effective pressures of 2 to 3 bar and average speeds of 2,000 r.p.m. for a maximum speed of approximately 4,000 r.p.m.

For mixed operation due to town and country driving, passenger car engines operate 80% of the time with a $p_{me}$ below 5 bar and two-thirds of the fuel consumption also occurs within this range. The high values of $p_{me}$ are only required for brief acceleration maneuvers but they must then be rapidly available at the required level. It is only at high motorway speeds and on steep mountain stretches that high mean effective pressures and speeds are demanded from the engine for longer periods.

For these reasons, supercharged passenger car engines must meet different operational behavior requirements than those of supercharged truck engines, for which high efficiency at high load is demanded, whereas from what has previously been stated the fuel consumption of car engines should be as small as possible at low loads, a higher consumption at large loads being accepted in order to meet this requirement.

The rapid increase in torque at low $p_{me}$ required for fast acceleration maneuvers is not easy to attain with exhaust gas turbochargers. This is because the exhaust gas temperature of diesel engines is low in this range, lying generally between 150° and 250° C., and consequently the energy available to the turbine is also small. Under these circumstances, the turbocharger operates with an overall efficiency of a maximum of 30%. The boost pressure is then lower than the exhaust gas pressure in front of the turbine and this implies negative scavenging work, i.e. a loss of efficiency. The negative pressure difference is then usually between 0.05 and 0.1 bar. It follows that the fuel consumption of a turbocharged engine in this range is also higher than that of a naturally aspirated engine, for which the suction pressure and the exhaust back pressure are approximately equal.

The losses due to the negative scavenging work under partial load increase with increasing pressure ratio across the turbine. In a certain Otto engine, the exhaust back pressure is reduced by blowing down exhaust gas before the turbine in order to reduce these losses. This measure is normally only applied in the upper speed range because the turbocharger is, as is known, matched with respect to boost pressure to the air requirement of the engine in the range mentioned of $p_{me}$ mainly used but characteristically provide pressures which are too high in the upper speed range and which are reduced by blowing down to a value which the engine can tolerate without being overloaded. Using this measure, an approximation is attained to the actual boost pressure variation which would be theoretically desirable for the engine. This variation, however cannot be considered ideal because there is a lack of torque at low engine speeds—the so-called turbo lag. Particularly disadvantageous with respect to driving operations is the fact that the turbocharger must first be brought up to speed during an acceleration maneuver before the necessary steady engine torque becomes available. This phenomenom is known as the "turbo lag".

A disadvantageous feature of this blowing-down under partial load before the turbine entry using an exhaust gas bypass, a so-called "waste gate", is that very little ram pressure builds up in front of the turbine so that the turbocharger speed remains even lower. It thus follows that there is a further delay when accelerating in addition to the already mentioned delayed response of the turbocharger, i.e. the turbo lag, because the desirable ram pressure build up for the rapid running up the turbine only appears after the waste gate is closed. This delay is even greater in the case of turbochargers with high pressure recirculation, because the latter can only be switched off at high $p_{me}$, e.g. 5 bar.

In order to avoid the disadvantages of conventional exhaust turbochargers with and without a waste gate, turbochargers have been variously proposed with variable swallowing capacity. In these turbocharger units, referred to as varioturbochargers hereinafter and which may also include variable compressors in some cases, the entry area of the turbine and thus its swallowing capacity is reduced using adjustable nozzle guide vanes, double volute intakes, diaphragm nozzle rings, and slideable nozzle rings, inter alia. The increased build up of ram pressure provides sufficient turbine power so that it runs faster even at low engine speed and develops a high torque. Furthermore, more energy is available for faster acceleration of the compressor in the load range mentioned at the beginning, within which the acceleration behavior of the engine is to be improved using the present invention.

The principle of the same features can also be used in internal combustion engines with other exhaust gas driven supercharger units, particularly with those using gas dynamic pressure wave superchargers with equipment for altering the exhaust gas swallowing capacity, such as a waste gate and recirculation duct. This is so because the exhaust gas temperature and therefore the energy available from the exhaust gases is also small in the low $p_{me}$ range in the situation where a diesel engine is combined with a pressure wave supercharger. In this case also, the engine must compensate for the negative scavenging work because the exhaust gas pressure in it is usually greater than the scavenging pressure by 0.1–0.15 bar in this operating condition. Such a pressure wave supercharger is indeed clearly superior to an exhaust gas turbocharger with respect to the acceleration capability of its air conveying element which is formed by a rotary vane, but even its response behavior upon change of load and, in particular, its fuel consumption can be improved by regulation according to the invention of the swallowing capacity of the pressure wave supercharger.

In the $p_{me}$-$n_m$ diagram of a typical passenger car engine shown in FIG. 1, the field of mean effective combustion pressures with which the vehicle is mainly operated, as mentioned at the beginning, is indicated by reference numeral 1. The range required for motorway and hill-climbing work is indicated by reference numeral 3 and the curve of maximum torque used for acceleration is indicated by reference numeral 2.

FIG. 2 shows the variation of the mean effective pressure $p_{me}$ on an engine with a conventional turbocharger with a waste gate and on an engine with a varioturbocharger with a waste gate. In this diagram, the full line curve 4 shows the pressure variation $p_{me}(n_m)$ of a varioturbocharger and the dashed curve 5 shows the corresponding variation of a normal turbocharger with constant turbine swallowing capacity. Up to the speed corresponding to the point 6, the curve 4 for the varioturbocharger lies above the curve 5 for the normal supercharger and it is only beyond this point that the latter utilizes the exhaust gas stream as well as the varioturbocharger and the two curves become coincident. Since, in the case of the varioturbocharger, the boost pressure permissible for the engine is attained at a lower engine speed, corresponding to point 7, than in the case of the normal turbocharger, the swallowing capacity of the varioturbocharger must be continually increased, in fact along the line 8 from the speed corresponding to point 7, whereas, like in the case of a normal turbocharger, the waste gate only begins to open along the line 9 respectively from the point 6. However, point 6 can also be chosen to be different from that of the normal turbocharger engine.

FIG. 2 thus shows an engine with a varioturbocharger has a higher torque in the sample chosen in the interesting speed range between about 1,000 and 2,000 r.p.m. and thus offers better acceleration.

To complement the statements made at the beginning, the behavior of a conventional turbocharger will be described using the diagram of FIG. 3 and, subsequently, the behavior of an engine with a varioturbocharger, a waste gate and possibly exhaust gas recirculation will be described using FIG. 4.

The two diagrams indicate the relationship between the mass flow $\dot{m}$ in kg/sec and the pressure ratio $\pi_T$ of the turbine and $\pi_v$ of the compressor for a typical passenger car engine with a waste gate with the assumption that $\dot{m}_m = \dot{m}_v = \dot{m}_T$. The dashed straight lines $S_{1,000}$ to $S_{4,000}$ are the swallowing capacity lines of the engine $\dot{m}_v(\pi_v)$ at the speeds $n_m = 1,000$ to $n_m = 4,000$ r.p.m. The full line parabola-shaped curves $T_{700}$, $T_{550}$ and $T_{225}$ are the turbine swallowing capacity lines $\dot{m}_T(\pi_T)$ at a gas entry temperature of 700° C., corresponding to a speed of approximately $n_m = 2,500$ r.p.m., at which the waste gate is still just closed, at a gas entry temperature of 550° C., at which the torque $M_d$ is attained at $n_m = 2,000$ r.p.m., and at 225° C. gas entry temperature, i.e. in the part load range with a $p_{me} = 2$ bar and $n_m = 2,000$ r.p.m. The curves $(T+WG)_{750}$ and $(T+WG)_{225}$ show the swallowing capacity lines for the turbine plus an open waste gate at 750° and 225° C. gas inlet temperature. Corresponding to the $M_{d\ max}$ curve of the engine, the operating points for the turbine lie on the dashed line between the point 10 of the line for $T_{700}$ and the point 11 on the line $(T+WG)_{750}$ and, in the case of the compressor, on the chain dotted curve between the point 12 and the point 13 on the swallowing capacity line $S_{4,000}$. It may be seen that the pressure difference between the compressor outlet and the turbine inlet up to the point 14, the intersection point of the two lines mentioned previously, is positive and then becomes negative up to the maximum engine speed. Thus in the latter range, the pressure upstream of the turbine is higher than that at the compressor outlet.

More important to understanding of the present invention are the relevant relationships of the present invention turbocharger in the partial load range, within which the torque behavior is to be improved using the invention. These are explained using the example of a condition with $p_{me} = 2$ bar, $n_m = 2,000$ r.p.m. and the temperature $T_{225}$ before the turbine. A closed waste gas then produces a $\pi_T = 1.1$ (see point 15). This provides a surplus pressure $\Delta p$ before the turbine compared with the boost pressure of 0.07 bar (see line $15-16 = \Delta p_{ow}$ :ow = without waste gate). The fuel consumption increases by approximately 1.6% due to the corresponding scavenging work of the piston. With the waste gate open, the surplus pressure drops to $\Delta p_{mw} = 0.03$ bar and if high pressure recirculation is also used, this surplus pressure with its deleterious effect on efficiency drops still further to $\Delta p_{mw+Rez}$.

Using the diagram in FIG. 4, the behavior of an engine with a varioturbocharger, a waste gate and with exhaust gas recirculation will now be discussed. Even if the varioturbocharger shows an advance with respect to the torque behavior in the lower speed range compared with a conventional turbocharger, it still has some operational deficiencies which, inter alia, are to be obviated with the present invention. The construction of such an engine is shown in principle in FIG. 5. In this diagram, reference numeral 17 represents a waste gate duct, 18 a recirculation duct available as required and the region 19 in the dashed circle the turbine inlet with variable flow area of a varioturbocharger. There are many proposals for solving varioturbocharger problems, including, inter alia, some with divided exhaust pipes for the application of the impulse design.

In addition to some symbols already familiar from FIG. 3, FIG. 4 includes the signs $VT_{zu}$ = varioturbocharger closed, i.e. throttled to the minimum flow area and $VT_{auf}$ = varioturbocharger open, with maximum flow area, which are supplied to the swallowing capacity lines of varioturbocharger VT. The indices 225 etc. in each case refer to the exhaust gas temperature at the turbine inlet.

The maximum torque corresponds to the point 20 and such is already reached at an engine speed of under 2,000 r.p.m. Since the highest permissible boost pressure is thus attained, the opening of the entry section of varioturbocharger now begins and this process is concluded at point 21. The further curve as far as point 22 then behaves like a conventional turbine with constant entry section. One difference is that the flow area when fully open can be arranged to be greater than the area of a conventional turbine for the same engine, so reducing the quantity blown down through the waste gate or, in the extreme case, obviating this altogether. However, a waste gate has been assumed for FIG. 4 and this functions in the range of 22 to 23.

Even at low speeds, a varioturbocharger thus provides the engine with sufficient air for the desired higher torque in the operating range mainly used in a typical passenger car engine, as mentioned in the introduction.

On the other hand, there are driving conditions which are less favorable compared with the normal turbocharger engine. At the partial load point 24 with $n_m = 2,000$ r.p.m and $p_{me} = 2$ bar, the exhaust gas builds up to $\pi_T = 1.3$ and the excess of exhaust pressure over boost pressure, represented by the line 24–25, attains $\Delta p_{VT} = 0.15$ bar, which causes a 1.85% higher fuel consumption as compared with a normal turbocharger. In fact, this is not absolutely prohibitive because using a varioturbocharger, the engine can be made smaller for the same driving performance in the operating range mentioned. However, much more unfavorable operating conditions still exist. For example, when travelling on the level at approximately 100 km/h, $p_{me}$ is approximately 4 bar, $n_m$ is approximately 3,000 r.p.m. and the temperature before the turbine approximately 350° C. Under these conditions, the surplus pressure $\Delta p_{VT}$ is approximately 0.6 bar, represented by the line 26-27. The boost pressure control is then at a position shortly before the opening of the varioturbocharger. Compared with a normal turbocharger, this implies excess fuel consumption of around 10%.

The disadvantage of the varioturbocharger consists in the fact that at low $p_{me}$ and correspondingly low temperature before the turbine, the difference between the exhaust gas pressure before the turbine and the boost pressure is greater than that with a normal turbocharger because of the higher pressure level of the varioturbocharger. In addition, the reduction of the turbine swallowing capacity is often associated with a certain deterioration in efficiency.

SUMMARY OF THE INVENTION

The object of the present invention is to overcome these drawbacks of the prior art.

In accordance with the present invention a method for supercharging internal combustion engines with turbochargers is disclosed wherein the engine is operated in the lowest load engine as a naturally aspirated engine, and the waste gate, the inlet section of the turbine and all other exhaust gas ducts present are fully open. When this load range is exceeded, the flow area of the turbine is reduced to its smallest possible value and subsequently, with a further increase in load, is increased again to its maximum value at full load. The engine operated operated according to this method has a varioturbocharger whose turbine flow area is controlled by a throttle slide as a function of the fuel injection quantity and the boost pressure by means of an adjustment device and a control pressure modulator.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
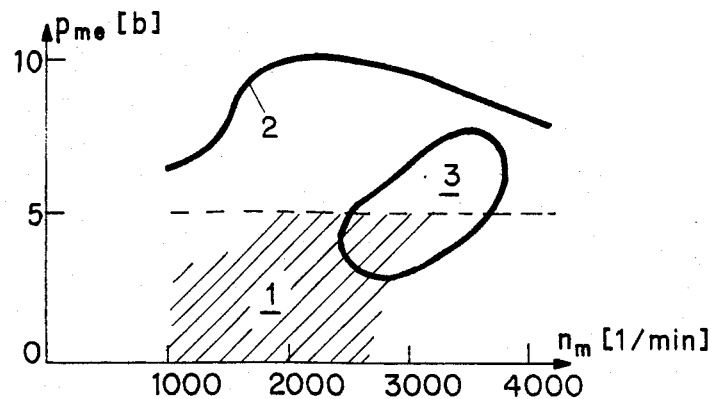
FIG. 1 shows the average operating characteristic of passenger car engines.
Figure 2:
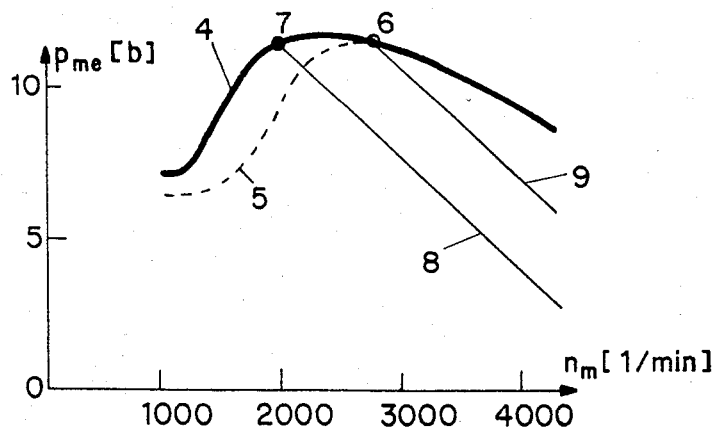
FIG. 2 shows the relationship between the mean effective pressure of a turbocharged engine and the speed ($p_{me}$—$n_m$ diagram) for two types of turbocharger.
Figure 3:
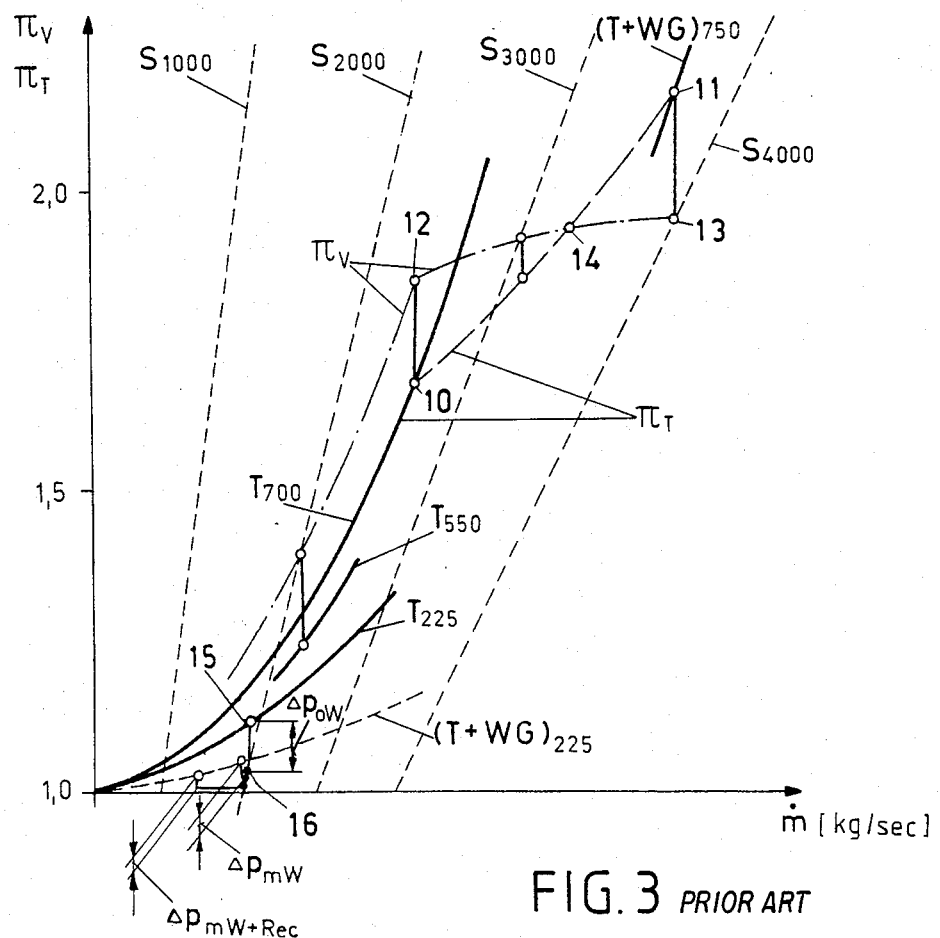
FIGS. 3 and 4 show the relationship between the mass flow through the engine and the pressure ratios of the compressor and the turbine for various types of turbochargers.
Figure 5:
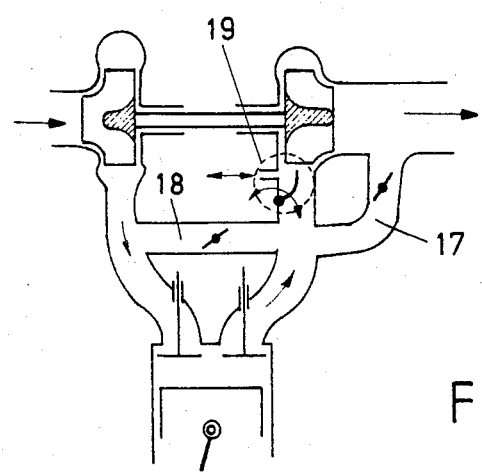
FIG. 5 shows schematically a turbocharged engine with a varioturbocharger, a waste gate and recirculation.
Figure 4:
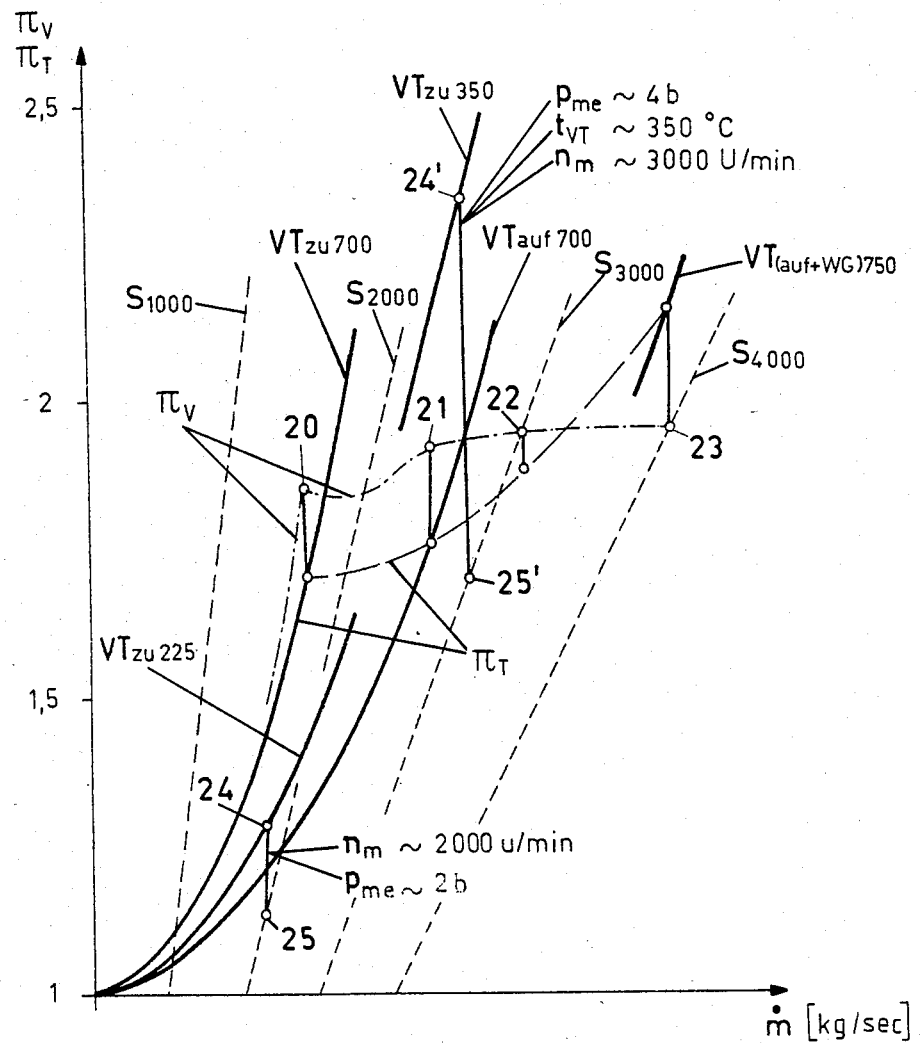
Figure 6:
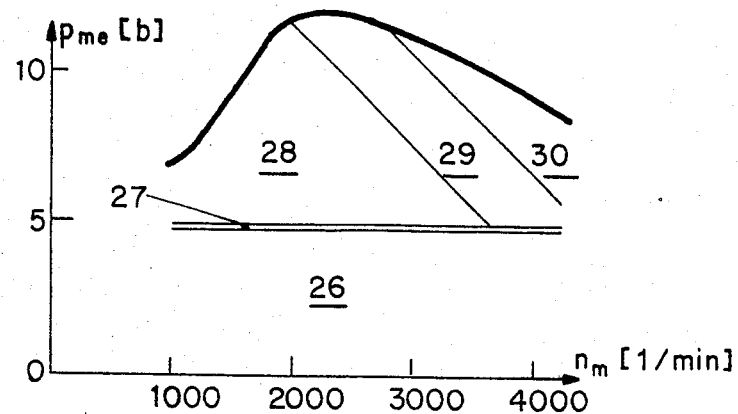
FIGS. 6 and 7 show two $p_{me}$—$n_m$ diagrams for turbocharged engines operated by the method according to the present invention, FIG. 8 schematically shows an illustrative example of a turbocharged engine according to the present invention.

FIG. 6 shows how an engine in accordance with the present invention with varioturbocharger and waste gate, and possibly also with exhaust gas recirculation, can be operated so as to provide a satisfactory torque behavior with improved efficiency over the complete load range. The diagram shows the division of the complete operating range into various load regions 26 to 30, within each of which, following the invention, a certain group of relationships is to be maintained between the mean effective pressure $p_{me}$ and the engine speed, the desired $p_{me}$ being set by control of the boost pressure and the fuel injection quantity. The method consists of the fact that up to a certain $p_{me}$, 5 bar in the example shown, the engine is operated as far as possible as a pure naturally aspirated engine, which means that the exhaust gas ducts are opened to the maximum extent through the turbine, the waste gate and, if available, also the recirculation duct. The engine then runs in a naturally aspirated operation and the difference between the exhaust gas back pressure and the boost pressure is reduced to very small values relative to turbocharged operation. Any possible excess fuel consumption will thus be very small. Means can be provided to open the waste gate further in this range than is required for its function as exhaust gas bypass in the limiting range of boost pressure.

Compared with the known exhaust gas turbocharger equipment, the turbo lag becomes smaller and the torque deficit in the region of the turbo lag is reduced.

The region 27 is the changeover zone in which an acceleration maneuver is introduced by the fastest possible closing of the waste gate and, if appropriate, of the recirculation duct, and adjustment of the inlet area of the turbine to its smallest value. The rapid build up of exhaust gas pressure rapidly supplies the turbine with energy and accelerates its run up compared with a normal turbocharger.

If exhaust gas recirculation is necessary for reduction of $NO_x$, the exhaust gas back pressure can not be reduced as much because otherwise the bypass is put in doubt. In order to guarantee recirculation, the waste gate must possibly remain closed and/or the turbine entry section can also not be fully opened. It is then necessary to find a compromise between consumption and exhaust gas emission.

In the region 28, the turbine is operated with the smallest entry section, i.e., the smallest swallowing capacity. There is thus sufficient build up of exhaust gas pressure available for a rapid response of the turbine during load increases. In the region 29, the intake section of the turbine is successively opened up to its maximum value in order to avoid $P_{me}$ values beyond the permissible limit and finally, the opening of the waste gate begins in region 30 until the throttle position required in each case is attained.

Figure 7:
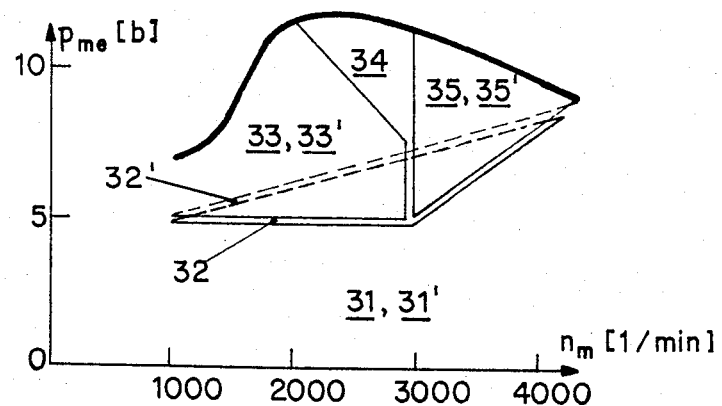

The diagram of FIG. 7 shows two advantageous modifications of the method according to FIG. 6, in which the variation of the changeover zones 32 and 32' is even more favorable with respect to torque variation and efficiency respectively. The region of naturally aspirated operation is thereby extended in both cases. In detail, the region 31 is limited in the upper direction by the full double line, the changeover zone 32, which runs parallel to the abscissa until the waste gate begins to open and subsequently runs at constant slope up to the maximum speed. The associated regions for operation with the minimum swallowing capacity of the turbine inlet, with increasing entry section of the turbine inlet and with steadily opening waste gate are indicated by reference numerals 33, 34 and 35 respectively.

In the case of the second variant, the changeover zone 32', represented by the dashed double line, runs at constant slope over the whole of the usable speed range. The operating region as a naturally aspirated engine then increases to region 31' and the two regions 33 and 35 of the first variant above the changeover zone 32' are reduced to the regions 33' and 35'.

Such control programs for the opening and closing of the elements to change the mass flow are nowadays most advantageously realized by microprocessors but conventional means are, of course, also possible such as hydraulic, pneumatic, electrical and similar control equipment.

Figure 8:
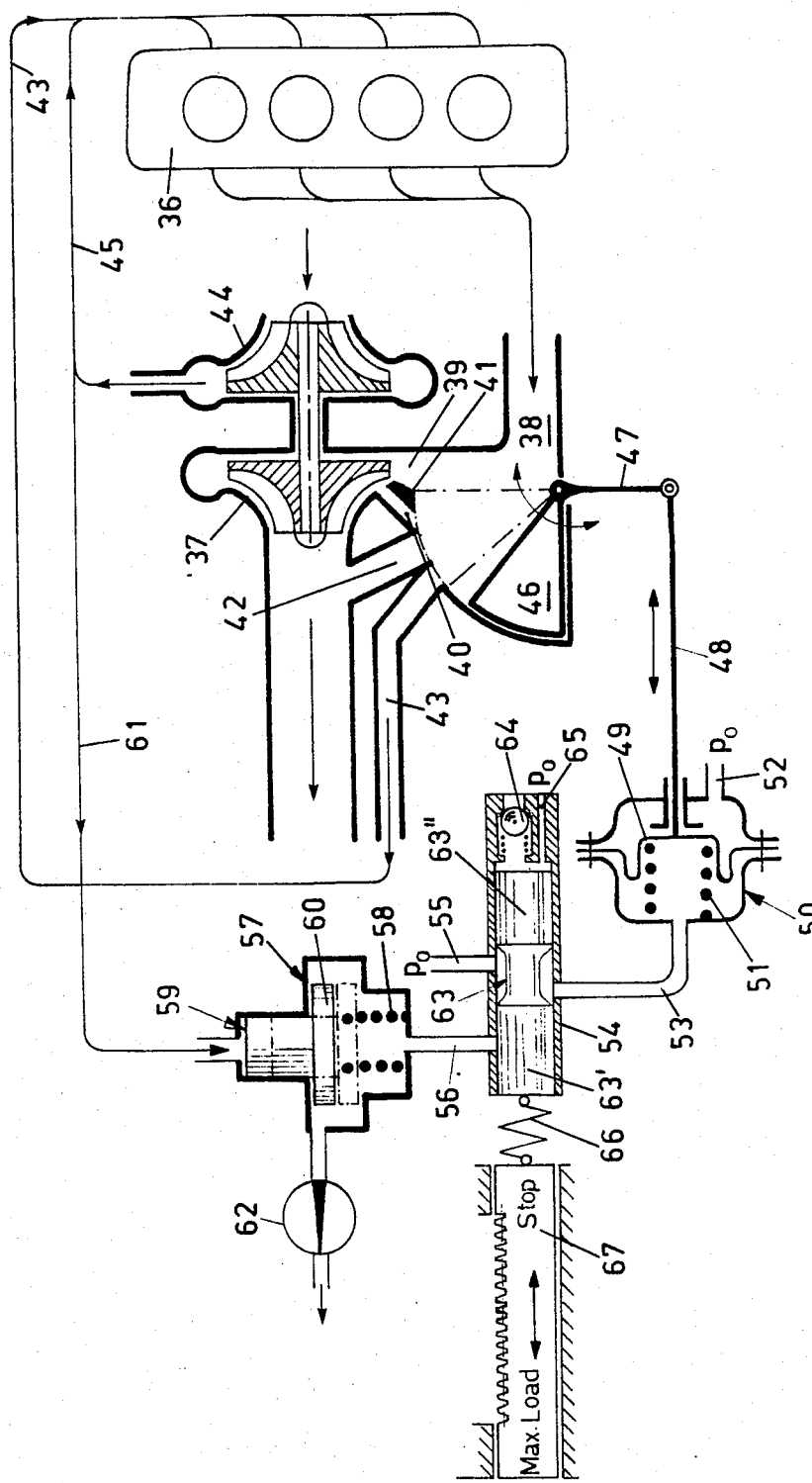

FIG. 8 indicates the arrangement for carrying out the control of the mean effective pressure $P_{me}$ shown in FIG. 6 for a diesel engine. The engine 36 supplies a turbine 37 through the exhaust gas duct 38. Three paths are open to the exhaust gas: through the turbine 37 via a main flow duct 39 and a bypass duct 40, which are separated from one another by a dividing wall 41, through a waste gas 42 and a recirculation duct 43. The waste gate 42 blows down into the open and the recirculation duct 43 feeds into a boost air duct 45 leading from the compressor 44 into the engine.

The control equipment includes a throttle slide 46 rotatably supported in the turbine intake casing and having a lever arm 47 with a rod 48 in contact with a diaphragm 49. This diaphragm seals across the casing of a servo motor 50 and loads the throttle slide 46 in the direction of movement to the fully opened position, shown in full lines, by means of a spring 51. The space to the right of the diaphragm 49 in the servo motor 50 is connected with atmosphere by means of a duct 52, while the space to the left of the diaphragm communicates via a duct 53 and the inside of a control cylinder 54, depending on the position of a control piston 63, either a via duct 55 communicating with atmosphere or via a duct 56 communicating with the inside of a control pressure modulator 57, in which a piston 59 with a valve plate 60 loaded by a spring 58 can slide. The cylinder space above the piston 59 communicates via a control air duct 61 with the boost air duct 45, while the space around the valve plate 60 is connected with a vacuum source 62.

The control cylinder 54 contains a control piston 63 with control piston sections 63', 63" and, in the right hand end of the cylinder, a spring loaded nonreturn valve 64 and a throttle hole 65. The control piston 63 is connected via an elastically sprung link 66 with an injection pump control rod 67, which is connected with the accelerator controlled by the driver via a rod (not shown).

A controlled cycle proceeds as follows: in the partial load region, in which the engine runs in naturally aspirated operation, the throttle slide 46 is held by the spring 51 at its bottom stop position shown in full lines, all the exhaust gas paths through the turbine 37, the waste gate 42 and the recirculation duct 43 being open. Atmospheric pressure is present on both sides of the diaphragm 49, since the spaces on both sides of the diaphragm 49 are connected with atmosphere via the ducts 52 and 53, the cylinder space between the two control piston sections 63' and 63" and via the duct 55, so that the force of the spring 51 has its full effect. In the control pressure modulator 57, the low idling boost pressure of naturally aspirated operation is present above the piston 59 and below it that of the vacuum produced by the vacuum source 62, for example the braking assistance vacuum pump. The spring 58 is so dimensioned that with these pressures on either side of the piston the latter is held in the fully open position shown in full lines.

When the accelerator is depressed, the control rod 67 is displaced to the left, the control piston 63 following because of the elastical spring connected through the link 66, and, from a certain accelerator pedal position which corresponds to the transistion from naturally aspirated operation to supercharged operation, connecting the duct 56 to the control pressure modulator 57 by the control edge of the left hand control piston section 63'. Communication of the duct 55 to the atmosphere is thereby closed because the distance between the control edges of the control piston sections 63' and 63" is equal to the distance between the two ducts 55 and 56. As a consequence, the vacuum present under the piston 59 is communicated to the spring side space of the servo motor 50, so that the atmospheric surplus pressure on the other side of the diaphragm 49 displaces the latter against the resistance of the spring 51 and thus rotates the throttle slide 46 in one movement into the position shown as a dashed line, which produces the strong build up of pressure before the turbine necessary for the acceleration.

The subsequently increasing boost pressure has an effect via the duct 61 on the piston 59 and increasingly narrows the annular gap between the valve plate 60 and its seating in the casing of the control pressure modulator 57 against the resistance of the spring 58. The resulting throttle reduces the vacuum in the servo motor 50, because of deliberate leakage between the control piston section 63" and the duct 55, whereby the spring 51 rotates the throttle slide 46 back again towards the initial position as a function of the increasing boost pressure and opens the entry section and the waste gate 42 in series until, at the maximum permissible boost pressure, the valve plate 60 had so far reduced the flow area that the throttle slide 46 has opened the waste gate as far as necessary but the recirculation duct 43 remains closed.

If the load is reduced, the control rod 67 is moved back, the injection quantity and consequently the exhaust gas pressure and the boost pressure decrease and a larger area is again opened to the valve plate 60. A stronger vacuum occurs again in the spring side space of the servo motor 50, whereby once again a more or less substantial portion of the section of the exhaust gas paths is closed by the waste gate and the variable turbine inlet path. With a reduction down to the injection quantity, under which the engine changes over to naturally aspirated operation, the control rod 67 displaces the control piston so far that the duct 56 is again shut off. The spring 51 then holds the throttle slide 46 on the idling stop until the accelerator is again strongly depressed. In the rest position, all the exhaust gas paths are always completely open, and this is therefore a safety arrangement.

The nonreturn (one-way) valve 64 in the control cylinder 54 permits the control piston 63 to follow the control rod 67 rapidly in the case of an increase in load, and, on the other hand, when the nonreturn valve is closed, the damping hole 65 avoids movement back of the throttle slide 46 during the gear changing pauses during high acceleration of the vehicle. As described herein, it is sufficient to control the control piston 63 in two positions: with duct 56 open and duct 55 closed, or vice versa. The modulation of the control pressure then only occurs due to change in the annular section around the valve plate 60 by means of the boost pressure, and the ventilation of the vacuum space in the servo motor 50 provided by the leakage.

Figure 9:
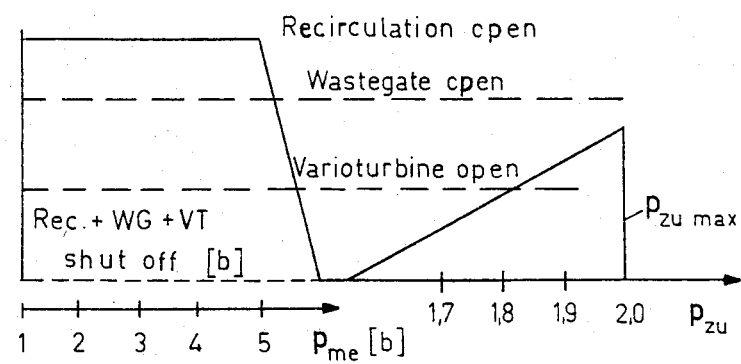
FIG. 9 shows the diagram of an advantageous control of the turbocharger of an engine according to FIG. 8.

It may be desirable to design the control so that the waste gate is more open under a small load than in the upper load region, approximately in accordance with the variation shown in FIG. 9.

Figure 10:
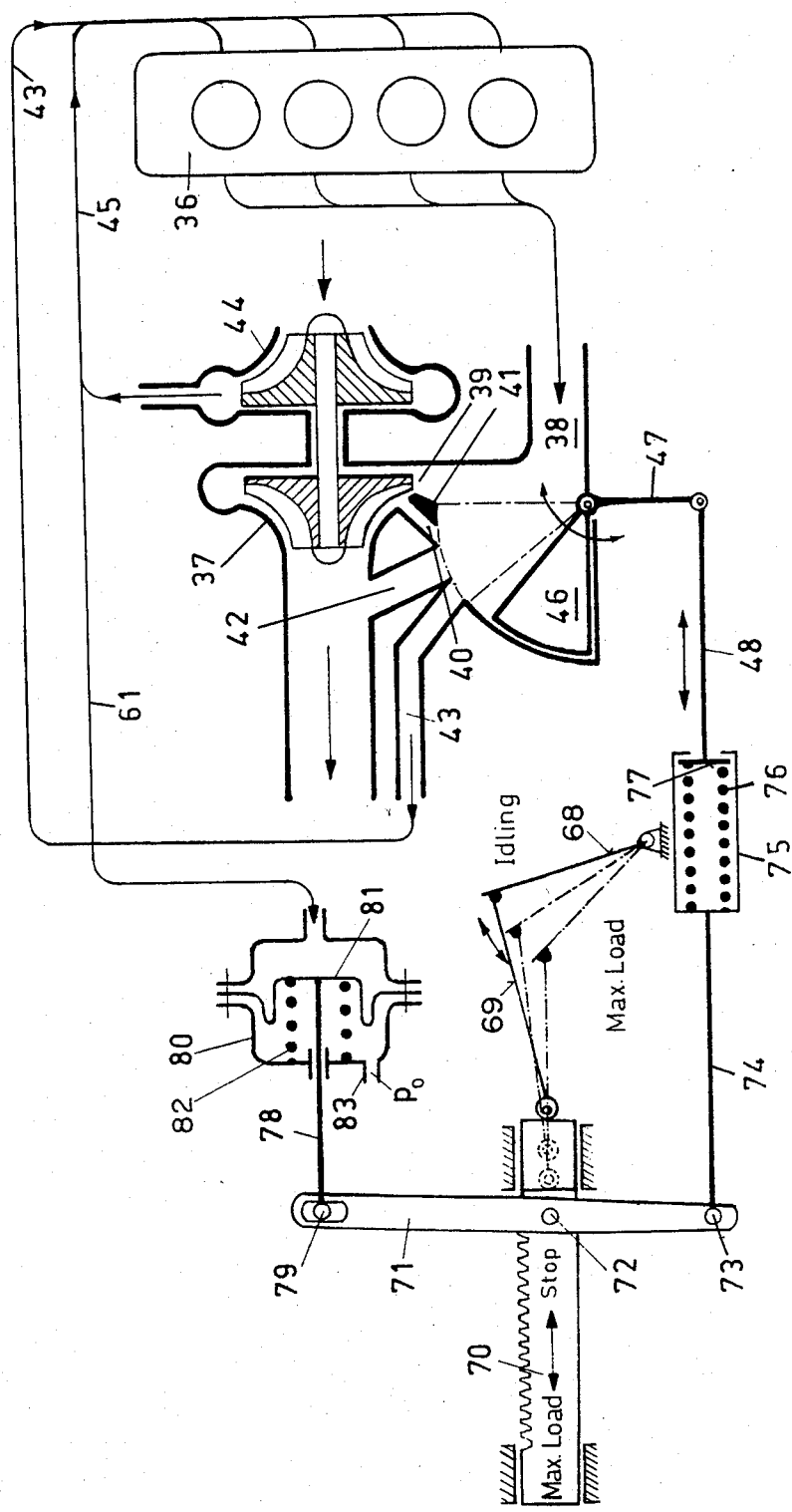
FIG. 10 shows a further illustrative example of a turbocharged engine according to the present invention.

In the turbocharged engine shown in FIG. 10 with a different control system, the parts of the engine including the turbocharger are indicated by the same reference numbers as used in FIG. 8. The accelerator 68 is connected with an injection pump control rod 70 via a linkage symbolized by a rod 69. A double arm control lever 71 is rotatably mounted on the latter by means of a pin 72. At the lower end of this control lever, a rod 74 with a spring housing 75 is connected by means of a pin 73. A spring 76 in the spring housing loads a spring plate 77 on the end of the rod 48 of the throttle slide 46 in the direction to the open end of the spring housing 75.

A rod 78 is connected at the upper end of the control lever 71 by means of a pin 79 supported so that it can slide in a slot in the control lever. The rod 78 is connected at its other end to a diaphragm 81 supported in a servo motor 80 and loaded by a spring 82. The spring side space is connected to atmosphere via a ventilation duct 83 but it could also be completely closed so that in it there is either a constant pressure at all altitudes or a pressure balance takes place because of a leakage in the guide of the rod 78 in the casing. The space on the other side in the casing of the servo motor is connected with the boost air duct 45 via the control air duct 61.

When the accelerator is depressed from the idling position the injection quantity is increased via the control rod for a fixed position of the pin 79 and, at the same time, the throttle slide 46 will be thereby moved upwards via the rods 74, 75 and 48 and the swallowing capacity of the turbine inlet is thus reduced. This procedure can be accelerated by a kick down so that starting with a load condition with a small $P_{me}$ the swallowing capacity of the turbine inlet is suddenly reduced and high acceleration achieved. As soon as the boost pressure attains and exceeds the planned limiting value, it displaces the diaphragm to the left, whereby with the pin 73 now in a fixed position, the throttle slide 46 is moved back again via the rods 74, 75, 48 and the swallowing capacity of the turbine inlet is thereby again increased.

The connection of the rods 74 and 48 by means of the spring 76 and the spring housing 75 is to ensure that when the accelerator 68 is released the control rod 70 can always return to the idling position i.e. even, for example, when the throttle slide 46 is jammed. Otherwise, it would continue to operate with the injection quantity of the last acceleration position in each case, i.e. at full acceleration for example.

With this control system, it may not be possible without additional measures to obtain a control characteristic with the small changeover region in accordance with FIGS. 6 and 7. For certain applications, such a rapid response may, however, not even by necessary.

Figure 11:
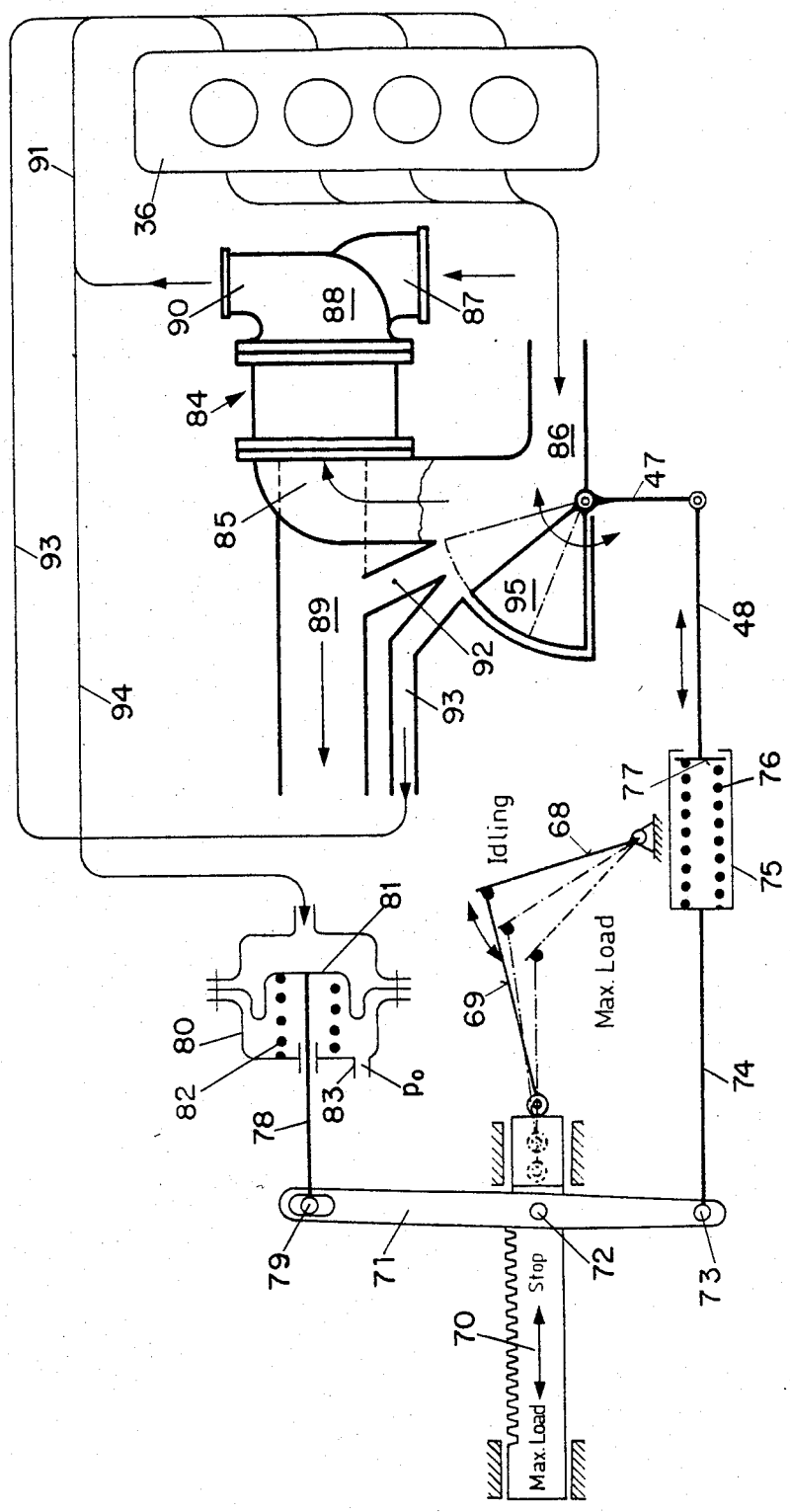
FIG. 11 shows an internal combustion engine with pressure wave turbocharger with a control device such as is also used on the turbocharged engine according to FIG. 10.

FIG. 11 shows the control equipment used for the turbocharger engine according to FIG. 10 in combination with a pressure wave supercharged engine. As the elements of this arrangement correspond to those of FIG. 10, the same reference numbers are used. The pressure wave supercharger 84 is connected via its gas casing 85 to the exhaust gas duct 86 of the engine 36 and aspirates the combustion air through the suction pipe 87 of the air casing 88. After performing the compression work in the rotor of the pressure wave supercharger, the exhaust gases leave the gas casing through the exhaust duct 89. The outlet pipe 90 of the air casing 88 is connected to the boost air duct 91 of the engine. A waste gate duct 92 branches from the gas casing 85 into the exhaust duct 89 and a recirculation duct 93 leads from the gas casing 85 into the induction duct of the engine 36. A control air duct 94 branches from the boost air duct 91 into the servo motor 80 of the control equipment, whose elements are identical with those of the control equipment according to FIG. 10 and for which, therefore, the reference numbers used there are retained. The throttle slide in front of the gas casing of the pressure wave supercharger is indicated by reference numeral 95.

The control procedure corresponds to that of the arrangement according to FIG. 10, but the throttle slide only has to close and open two flow areas in this case, namely the waste gate and the recirculation duct. It could prove desirable also to block off a part of the exhaust gas flow area in the gas casing by means of the throttle slide 95.

As far as the application of the methods to turbocharged engines is concerned, it is suitable not only for varioturbochargers, but also for turbochargers with only one waste gate or with recirculation in addition as described above for the pressure wave supercharged engine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for supercharging an internal combustion engine of a vehicle by an exhaust gas turbocharger having a plurality of engine exhaust gas paths which include a turbine inlet path of variable area for directing at least some engine exhaust to a turbine of said turbocharger and a waste gate duct for selectively directing at least some engine exhaust so as to bypass said turbine, said waste gate duct serving to blow down surplus exhaust gas from said engine under a high engine load, which comprises:

operating the engine as a naturally aspirated engine in a lower load region;

holding fully open said engine exhaust gas paths once the engine is operating in said lower load region;

closing said exhaust gas paths to a minimum operational value of flow area such that said variable turbine inlet area has a minimum operational value and the remainder of said plurality of exhaust gas paths are closed when a medium load operating condition of said engine is attained; and continuously opening the flow area of said variable turbine inlet area and subsequently opening a section of the waste gate duct upon the occurrence of an increasing load on the engine until a maximum predetermined permissible mean combustion pressure is attained.

2. A method as claimed in claim 1, which further comprises holding said exhaust gas paths further open in said low load region than at said maximum load region.

3. A method as claimed in claim 1, which further comprises holding constant the existing open areas of the exhaust gas paths for a predetermined period while changing gears during acceleration of said vehicle.

4. A method as claimed in claim 1, wherein said plurality of exhaust gas paths further comprise a recirculation duct for return of path of said exhaust gas into the boost air, and which method further comprises holding fully open said recirculation duct when said engine is operating under said lower load region.

5. A method as claimed in claim 1, which further comprises:

sampling both a boost pressure created by a compressor of said turbocharger and the fuel supply rate as a measure of mean effective pressure;

controlling said opening and closing of said exhaust gas paths using said sampled boost pressure and fuel supply rate to establish a range of mean effective pressure such that, within said range, there occurs said closing of said exhaust gas paths to said minimum operational value of flow area when the operating state of said engine changes from said lower load region to said medium load operating condition; and maintaining the magnitudes of the mean effective pressures bounding said range constant over the entire speed range of the engine.

6. A method as claimed in claim 1, which further comprises:

sampling both a boost pressure created by a compressor of said turbocharger and the fuel supply rate as a measure of mean effective pressure;

controlling said opening and closing of said exhaust gas paths using said sampled boost pressure and fuel supply rate to establish a range of mean effective pressure such that, within said range, there occurs said closing of said exhaust gas paths to said minimum operational value of flow area when the operating state of said engine changes from said lower load region to said medium load operating condition; and maintaining the magnitudes of the mean effective pressures bounding said range constant over a lower speed range of the engine and increasing same in direct proportion to engine speed at engine speeds above said lower speed range.

7. A method as claimed in claim 1, which further comprises:

sampling both a boost pressure created by a compressor of said turbocharger and the fuel supply rate as a measure of mean effective pressure;

controlling said opening and closing of said exhaust gas paths using said sampled boost pressure and fuel supply rate to establish a range of mean effective pressure such that, within range, there occurs said closing of said exhaust gas paths to said minimum operational value of flow area when the operating state of said engine changes from said lower load region to said medium load operating condition; and increasing the magnitudes of the mean effective pressures bounding said range in direct proporton to engine speed over the entire speed range of the engine.

* * * * *